United States Patent
Rangegowda et al.

(10) Patent No.: US 8,479,194 B2
(45) Date of Patent: Jul. 2, 2013

(54) VIRTUAL MACHINE MIGRATION

(75) Inventors: Dharshan Rangegowda, Seattle, WA (US); Robert Fries, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1085 days.

(21) Appl. No.: 11/789,727

(22) Filed: Apr. 25, 2007

(65) Prior Publication Data

US 2008/0270564 A1 Oct. 30, 2008

(51) Int. Cl.
  *G06F 9/455* (2006.01)
  *G06F 9/46* (2006.01)
  *G06F 15/173* (2006.01)

(52) U.S. Cl.
  USPC ............... 718/1; 718/100; 718/104; 709/226

(58) Field of Classification Search
  USPC .......................... 718/1, 104; 711/4; 709/226
  See application file for complete search history.

(56) References Cited

U.S. PATENT DOCUMENTS

| | | | |
|---|---|---|---|
| 5,095,427 A | 3/1992 | Tanaka et al. | |
| 5,506,975 A | 4/1996 | Onodera | |
| 6,671,820 B1 | 12/2003 | Kelman | |
| 6,763,455 B2 | 7/2004 | Hall | |
| 6,802,062 B1 | 10/2004 | Oyamada et al. | |
| 6,961,838 B2 | 11/2005 | Reuter et al. | |
| 7,003,642 B2 | 2/2006 | Dawkins et al. | |
| 7,010,663 B2 | 3/2006 | George et al. | |
| 7,093,086 B1 | 8/2006 | van Rietschote | |
| 7,155,558 B1 * | 12/2006 | Vaghani et al. | 711/4 |
| 7,194,727 B2 * | 3/2007 | Kaski et al. | 717/104 |
| 7,257,811 B2 * | 8/2007 | Hunt et al. | 718/1 |
| 7,269,683 B1 * | 9/2007 | Vaghani et al. | 711/4 |
| 7,512,769 B1 * | 3/2009 | Lowell et al. | 711/203 |
| 7,865,893 B1 * | 1/2011 | Omelyanchuk et al. | 718/1 |
| 2003/0005102 A1 * | 1/2003 | Russell | 709/223 |
| 2003/0120780 A1 * | 6/2003 | Zhu et al. | 709/226 |
| 2003/0149736 A1 * | 8/2003 | Berkowitz et al. | 709/213 |
| 2004/0010787 A1 | 1/2004 | Traut et al. | |
| 2004/0054866 A1 | 3/2004 | Blumenau et al. | |
| 2004/0260965 A1 | 12/2004 | Kelman | |
| 2005/0044199 A1 | 2/2005 | Shiga et al. | |
| 2005/0268298 A1 * | 12/2005 | Hunt et al. | 718/1 |
| 2006/0041786 A1 * | 2/2006 | Janakiraman et al. | 714/13 |
| 2006/0053121 A1 * | 3/2006 | Zizys et al. | 707/100 |

(Continued)

FOREIGN PATENT DOCUMENTS

JP  2005222123  8/2005

OTHER PUBLICATIONS

"Foreign Office Action", *Application Serial No. 1143-2008*, (Jan. 15, 2010), 10 pages.

(Continued)

*Primary Examiner* — Emerson Puente
*Assistant Examiner* — Charles Swift
(74) *Attorney, Agent, or Firm* — Wolfe-SBMC

(57) ABSTRACT

Virtual machine migration is described. In embodiment(s), a virtual machine can be migrated from one host computer to another utilizing LUN (logic unit number) masking. A virtual drive of the virtual machine can be mapped to a LUN of a storage array. A LUN mask associates the LUN with a host computer. The LUN mask can be changed to unmask the LUN to a second computer to migrate the virtual machine from the host computer to the second computer.

16 Claims, 8 Drawing Sheets

U.S. PATENT DOCUMENTS

| | | | |
|---|---|---|---|
| 2006/0085618 A1 | 4/2006 | Mimatsu et al. | |
| 2006/0101189 A1 | 5/2006 | Chandrasekaran | |
| 2006/0130052 A1 | 6/2006 | Allen et al. | |
| 2007/0169121 A1* | 7/2007 | Hunt et al. | 718/1 |
| 2008/0189468 A1* | 8/2008 | Schmidt et al. | 711/6 |
| 2008/0189700 A1* | 8/2008 | Schmidt et al. | 718/1 |
| 2008/0244028 A1* | 10/2008 | Le et al. | 709/208 |
| 2009/0113422 A1* | 4/2009 | Kani | 718/1 |

OTHER PUBLICATIONS

"PCT Search Report and Written Opinion", *Application No. PCT/US2008/057754*, (Jul. 29, 2008), 10 pages.

"Foreign Office Action", *Chilean Application No. 1143-2008*, (Jun. 16, 2010), 10 pages.

Feng et al., "Virtual Disk Reconfiguration with Performance Guarantees in Shared Storage Environment", Date: Jul. 4-7, 2005, on pp. 69-74, vol. 2, http://ieeexplore.ieee.org/search/srchabstract.jsp?arnumber=1488930&isnumber=32022&punumber=9966&k2dockey=1488930@ieeecnfs&query=1488930%3Cin%3Earnumber&pos=0.

Lu et al., "Aqueduct: online data migration with performance guarantees", Date: 2002, Article No. 21, USENIX Association Berkeley, CA, USA, http://delivery.acm.org/0.1145/1090000/10833581/p-lu.pdf?key1=1083351&key2=8927396511&coll=GUIDE&dl=GUIDE&CFID=1331860&CFTOKEN=80103968.

Naegel, Bruce, "Challenges and Solutions in Allocating Data in a SAN Environment", http://www.storageconference.org/2001/2001CD/v01naege.pdf.

"Extended European Search Report", *European Patent Application No. 08769031.9*, (Mar. 19, 2012), 9 pages.

"VMware ESX Server—Providing LUN Security", *VMware White Paper*, Available at <http://www.vmware.com/pdf/esx_lun_security.pdf>, (Mar. 9, 2006), pp. 1-4.

Nelson, Michael et al., "Fast Transparent Migration for Virtual Machines", 2005 USENIX Annual Technical Conference, (Apr. 10, 2005), pp. 391-394.

"Foreign Office Action", Japanese Application No. 2010-506363, (Jun. 15, 2012), 4 pages.

"Foreign Office Action", Chinese Application No. 200880013414.0, (Dec. 4, 2012), 8 pages.

"Foreign Office Action", Japanese Application No. 2010-506363, (Mar. 1, 2013), 7 pages.

\* cited by examiner

VIRTUAL MACHINE MIGRATION

BACKGROUND

In a data center environment, virtualization can be utilized to consolidate resources for several, otherwise independent computers each running a single application. For example, a business may implement a network having three separate computers, one each as a Web server, a database server, and an email server. Separate computers implemented to each run a single application can be significantly underutilized and is an inefficient use of the resources. The three business servers can be consolidated into one physical device that is a virtual host computer of three virtual machines, and each one of the virtual machines can independently run one of the business server applications.

Each virtual machine is a software component of the virtual host computer that has the appearance of having its own processor, disk drives, network controller, and the like. However, a virtualization manager efficiently utilizes and allocates shared resources for the virtual machines, such as common processors and memory. Data centers having multiple, independent computers can be virtualized to consolidate hardware, resources, and systems management.

In a virtual environment having more than one virtual host computer, and each being a virtual host of any number of virtual machines, one virtual machine can be moved or "migrated" from one virtual host computer to another. A virtual machine may be moved from one virtual host computer to another for various reasons, such as load balancing, to perform maintenance on the virtual host, for task sharing, and the like. The virtual hard drives for a virtual machine of a virtual host computer tend to be of large size, and typically in the order of gigabytes. When a virtual machine is migrated from one virtual host computer to another, transferring the corresponding large data files can take a considerably long time. Further, the virtual machine that is being migrated is shut down and unavailable during the migration process from one virtual host computer to another.

SUMMARY

This summary is provided to introduce simplified concepts of virtual machine migration, which is further described below in the Detailed Description. This summary is not intended to identify essential features of the claimed subject matter, nor is it intended for use in determining the scope of the claimed subject matter.

In embodiment(s) of virtual machine migration, a virtual machine can be migrated from one host computer to another utilizing LUN (logical unit number) masking. A virtual hard drive of the virtual machine can be mapped to a LUN of a storage array. In one configuration, all the virtual hard drives of a virtual machine can be stored on a single LUN. A LUN mask associates a LUN with a host computer. The LUN mask can be changed to unmask the LUN to a different computer to migrate the virtual machine from the host computer to the second computer.

In other embodiment(s) of virtual machine migration, a virtual manager can be implemented for the centralized management of virtual machines in a virtualization system. The virtual manager can initiate the creation of a LUN on a storage array and unmask the LUN to associate the LUN with the virtual manager. The virtual manager can also initiate the creation of a virtual machine from a virtual machine template where the virtual machine has an associated virtual drive and is configured to execute on a host computer. The virtual machine template can include selected reliability configuration information for the LUN, and thus for the virtual drive. The virtual manager can then unmask the LUN from the virtual manager to the virtual drive of the virtual machine on the host computer.

BRIEF DESCRIPTION OF THE DRAWINGS

Embodiments of a virtual machine migration are described with reference to the following drawings. The same numbers are used throughout the drawings to reference like features and components.

DETAILED DESCRIPTION

Embodiments of virtual machine migration provide techniques to migrate a virtual machine from one virtual host computer to another utilizing a storage area network. In an embodiment, a virtual machine can be migrated from one host computer to another utilizing LUN (logical unit number) masking. A LUN is a logical unit that represents data storage made available by the storage area network, and a LUN can map to any number of physical drives of the storage area network. Migrating a virtual machine utilizing LUN masking is faster than having to copy all of the files for the virtual machine to a destination host computer.

While features and concepts of the described systems and methods for a virtual machine migration can be implemented in any number of different computing systems and environments, embodiments of virtual machine migration are described in the context of the following example systems and environments.

Figure 1:
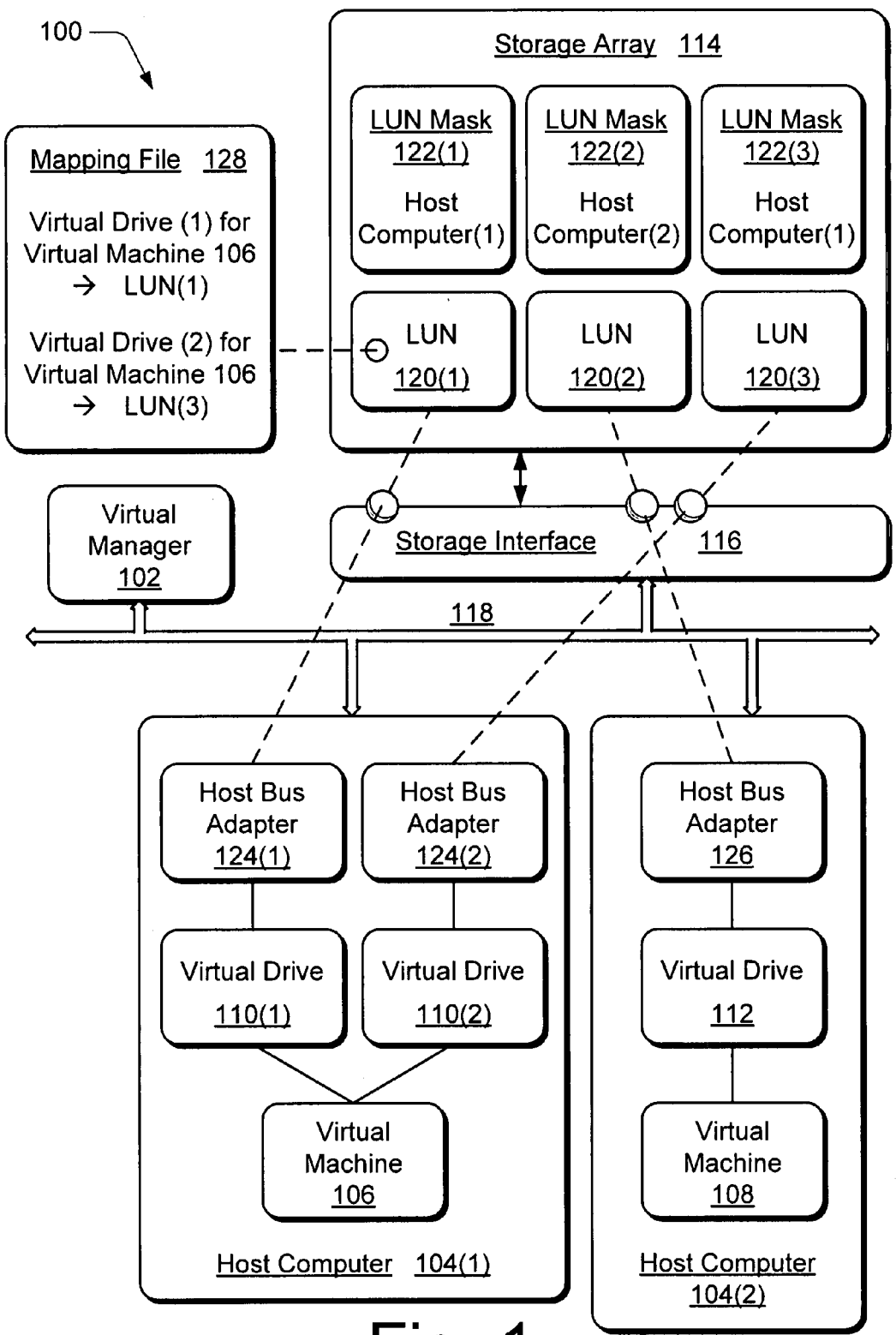
FIG. 1 illustrates an example virtualization system in which embodiments of virtual machine migration can be implemented.

FIG. 1 illustrates an example virtualization system 100 in which embodiment of virtual machine migration can be implemented. In an embodiment, a virtual manager 102 manages and controls host computers 104(1-2) which are virtual hosts computers to any number of virtual machines. The virtualization system 100 is an example of a business data center having virtual machines that appear as virtualized, independent computers to consolidate hardware, resources, and/or systems management. Although only two host computers 104(1-2) are shown, the virtualization system 100 can include any number of host computer devices that are managed by the virtual manager 102.

Host computers 104(1-2) can each include any number of virtual machines. In this example, host computer 104(1) includes a virtual machine 106, and host computer 104(2) includes a virtual machine 108. Each virtual machine 106, 108 is implemented as a software component of a respective host computer and can be managed to run efficiently utilizing shared resources of a host computer, such as common processors and memory. Each host computer 104(1-2) can be implemented to include one or more processors (e.g., any of microprocessors, controllers, and the like), and can include any type of computer-readable media that provides data storage for a host computer.

The computer-readable media of host computers 104(1-2) can maintain software applications, such as an operating system and any number of virtual machines. The software applications can be implemented as computer-executable instructions and executed by the processor(s) of a host computer to implement embodiments of virtual machine migration. Additionally, the host computers 104(1-2) can include any number and combination of differing components as further described with reference to the example computer device shown in FIG. 8.

In virtualization system 100, virtual machine 106 in host computer 104(1) has two associated virtual drives 110(1-2) (also referred to as "virtual hard drives"). Similarly, virtual machine 108 in host computer 104(2) has an associated virtual drive 112. Although virtual machine 106 is shown having only two associated virtual drives, and virtual machine 108 is shown having only one associated virtual drive, any number of virtual drives can be associated with a virtual machine. The virtual drives 110(1-2) and 112 can each be implemented as a file at a respective host computer which maps to a LUN on a network-connected storage array. In the virtualization implementation, a "disc access" event initiated by a virtual machine to a virtual drive is executed as a file-read or as a file-write command.

The virtualization system 100 includes a storage array 114 which can include any number of physical drives and/or storage media that maintains computer-readable data for the host computers 104(1-2) and/or the virtual machines 106, 108. The storage array 114 in combination with data switches is also referred to as a "storage area network", or SAN, and can be network-connected through a storage interface 116 to the host computers 104(1-2) via a data network 118.

The data network 118 can be implemented as any type of data or communication network with any type of protocol, and can be represented or otherwise implemented as a combination of two or more networks. For example, the data network 118 can be implemented as a fibre channel or as an iSCSI (Internet Small Computer System Interface) network that communicatively links the storage interface 116 of the storage array 114 to the host computers 104(1-2).

The storage array 114 includes LUNs 120(1-3) which are each a "logical unit number" that represents a unit of storage exposed or made available by the storage array 114. A LUN can map to several physical drives and/or storage media of the storage array 114 and can be implemented as any type of LUN, such as simple, spanned, striped, striped with parity, etc. Each of the LUNs 120(1-3) has a corresponding LUN mask 122(1-3), respectively. A LUN mask can be implemented as a list that identifies which host computer can access the corresponding LUN to control host computer access to the storage array 114. The unmasking list of a LUN is the list of computers and/or communication ports on the network that are granted access to the LUN, and the operation of setting the list is referred to as LUN masking. In this example, LUN mask 122(1) associates LUN 120(1) with host computer 104 (1), LUN mask 122(2) associates LUN 120(2) with host computer 104(2), and LUN mask 122(3) associates LUN 120(3) with host computer 104(1).

The storage interface 116 is also referred to as the "SAN fabric" and can be implemented as any number of interconnected SAN (storage area network) switches that facilitate data communication between the storage array 114 and the data network 118. Each of the virtual drives 110(1-2) of virtual machine 106, and virtual drive 112 of virtual machine 108, are mapped to a LUN of the storage array 114. The virtual drives 110(1-2) and 112 are also connected to the data network 118 via a respective host bus adapter. In this example, virtual drive 110(1) of virtual machine 106 is mapped to LUN 120(1) of the storage array 114 and is connected through the data network 118 by host bus adapter 124(1). Similarly, virtual drive 110(2) of virtual machine 106 is mapped to LUN 120(3) of the storage array 114 and is connected through the data network 118 by host bus adapter 124(2). The virtual drive 112 of virtual machine 108 is mapped to LUN 120(2) of the storage array 114 and is connected through the data network 118 by host bus adapter 126.

In an embodiment of virtual machine migration, a virtual machine can be migrated from one host computer to another utilizing LUN masking. In this example virtualization system 100, the virtual manager 102 can initiate and manage the migration of virtual machine 106 from host computer 104(1) over to host computer 104(2). Initially, each file for the virtual drives 110(1-2) of virtual machine 106 is placed on a LUN. The files for the virtual drives can all be placed on a single LUN, or each file can be placed on a separate LUN. In this example, LUN 120(1) of the storage array 114 references a mapping file 128 that maps the virtual drives 110(1-2) of virtual machine 106 to the LUN. The relationship of virtual machines to virtual hard drives and LUNs can be tracked in a database table.

The virtual manager 102 can then initiate that virtual machine 106 be shut down to a stopped and saved state on host computer 104(1). The virtual drives 110(1-2) of virtual machine 106 can be disassociated from host computer 104(1), and virtual machine 106 can be deleted from host computer 104(1). The LUN masks 122(1) and 122(3) can be changed to unmask respective LUNs 120(1) and 120(3) from host computer 104(1) and associate the LUNs with host computer 104(2) to migrate the virtual machine 106 from host computer 104(1) to host computer 104(2). Virtual machine 106 can then be created on host computer 104(2) according to the mapping file 128 such that the virtual drives 110(1-2) are each mapped from the respective LUNs 120(1) and 120(3) on the storage array to the virtual machine on the host computer 104(2).

Figure 2:
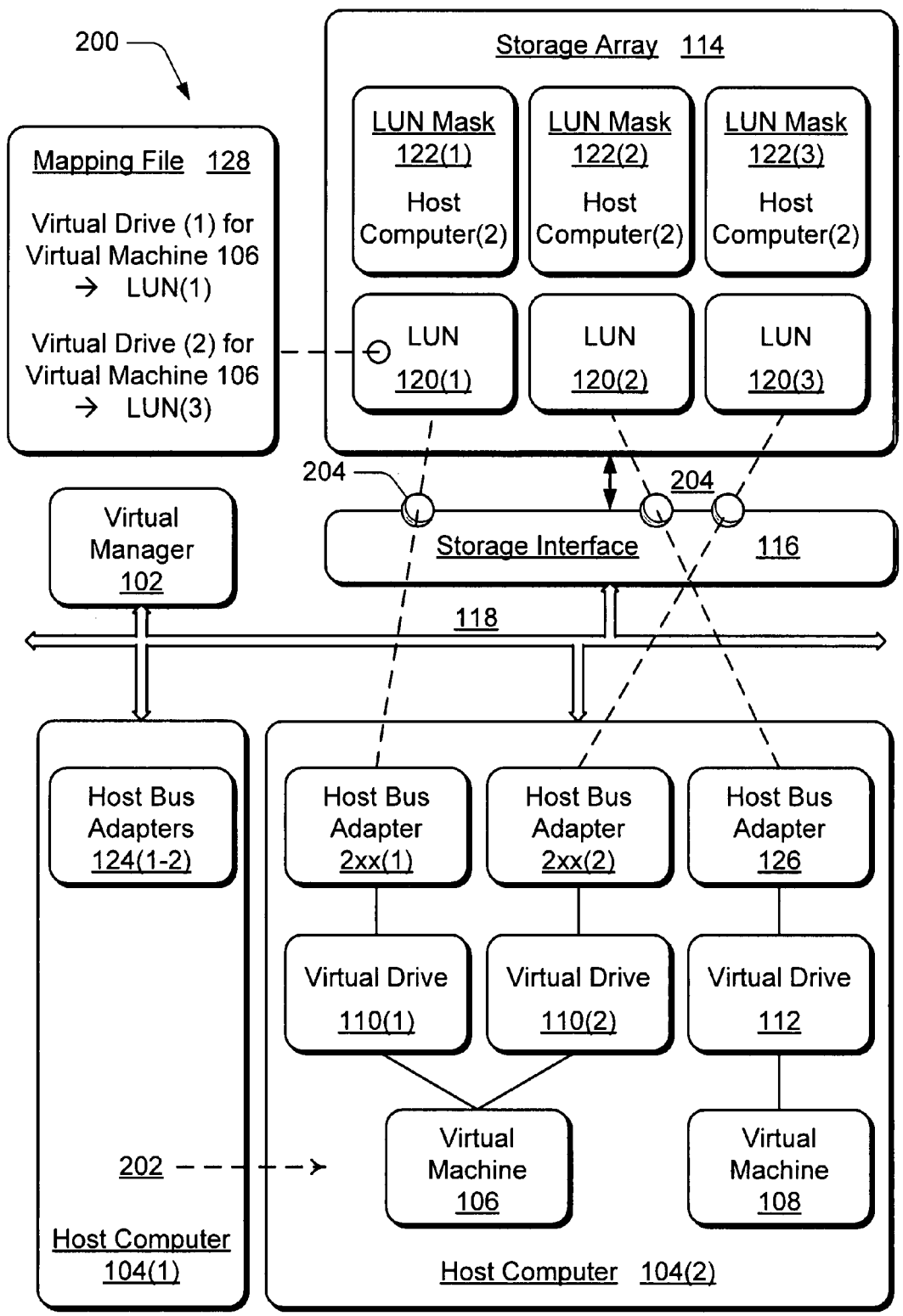
FIG. 2 further illustrates the example virtualization system shown in FIG. 1, and illustrates an embodiment of virtual machine migration.

FIG. 2 illustrates an example virtualization system 200 that further illustrates the virtualization system 100 shown in FIG. 1. In the example virtualization system 200, virtual machine 106 has been migrated (at 202) from host computer 104(1) over to host computer 104(2). The LUN masks 122(1) and 123(3) identify that host computer 104(2) can access the corresponding LUNs 120(1) and 120(3) after the migration of virtual machine 106.

If the data network 118 is implemented as an iSCSI network, a LUN can be moved by logging out from a host computer and logging in from another host computer. For example, the virtual machine 106 can be migrated from host computer 104(1) over to host computer 104(2) when the corresponding LUNs 120(1) and 120(3) are surfaced on host computer 104(2) by logging them into the iSCSI network. In an implementation, a LUN may also be authenticated to log into the iSCSI network.

In an embodiment of virtual machine migration, the virtual manager 102 can determine which host computers in a set of host computers are valid targets for virtual machine migration utilizing LUN masking. A task or procedure can be initiated to periodically execute and determine which of the host computers are valid targets for virtual machine migration. The task can be implemented to poll each of the host computers to determine which communication ports 204 of the storage interface 116 are accessible to which host computers. An application program interface (API) of a host bus adapter can be used to determine which of the communication ports 204 are visible on the storage interface 116 to a particular host computer. The correlation information can then be maintained in a database table on the storage array for reference.

To determine which of the host computers are a valid target for virtual machine migration, the virtual manager 102 can identify all of the virtual drives attached to each of the different host computers. The virtual manager 102 can then map each of the files for the virtual drives to a LUN on the storage array 114. The virtual manager 102 can also identify the communication ports 204 of the storage interface 116 to which each of the LUNs are exposed for data communication. This correlation information is then maintained in the database table for reference.

Before virtual machine 106 is migrated from host computer 104(1) to host computer 104(2), the virtual manager 102 can determine whether the LUNs 120(1) and 120(3) are "visible" to both of the host computers 104(1) and 104(2) through the storage interface 116. The virtual manager 102 can identify the one or more communication ports 204 of the storage interface 116 that the LUNs are mapped to for data communication. The virtual manager 102 can then determine whether the first host computer 104(1) can access the storage array 114 via any of the one or more identified communication ports 204. Similarly, the virtual manager 102 can determine whether the second host computer 104(2) can access the storage array 114 via any of the one or more identified communication ports 204. In an event that both of the host computers 104(1) and 104(2) can access the storage array 114 via at least one of the identified communication ports 204 (and not necessarily the same communication port), the virtual manager 102 can then initiate and manage the migration of virtual machine 106.

Generally, any of the functions, methods, and modules described herein can be implemented using hardware, software, firmware (e.g., fixed logic circuitry), manual processing, or any combination thereof. A software implementation of a function, method, or module represents program code that performs specified tasks when executed on a computer processor. Example methods 300, 400, and 600 described with reference to FIGS. 3, 4, and 6 may be described in the general context of computer-executable instructions. Generally, computer-executable instructions can include applications, routines, programs, objects, components, data structures, procedures, modules, functions, and the like that perform particular functions or implement particular abstract data types. The method(s) may also be practiced in a distributed computing environment where functions are performed by remote processing devices that are linked through a communications network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
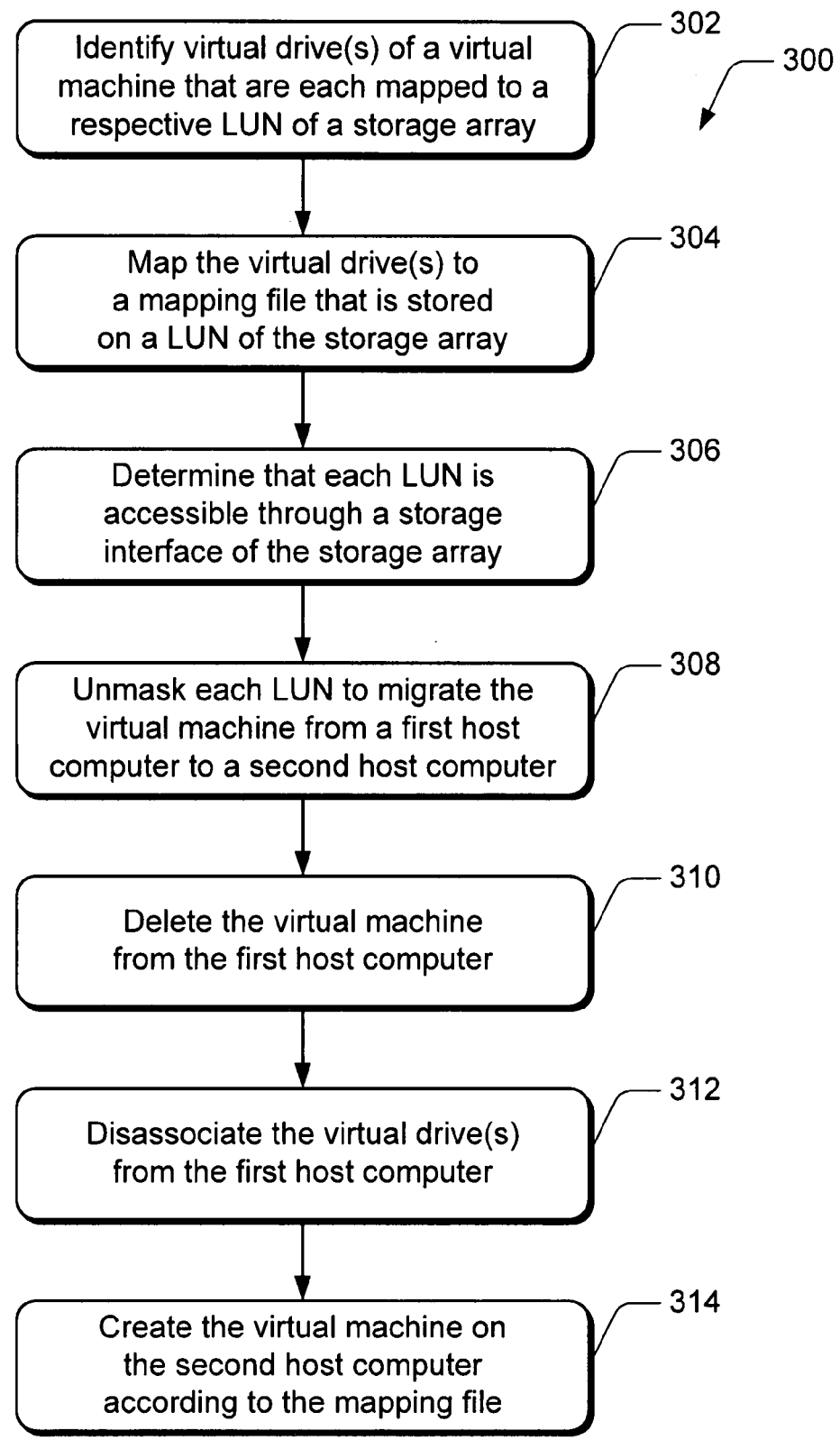
FIG. 3 illustrates example method(s) for virtual machine migration in accordance with one or more embodiments.

FIG. 3 illustrates example method(s) 300 of virtual machine migration. The order in which the method is described is not intended to be construed as a limitation, and any number of the described method blocks can be combined in any order to implement the method, or an alternate method.

At block 302, virtual drive(s) of a virtual machine are identified where a virtual drive is mapped to a respective LUN of a storage array. For example, the virtual manager 102 (FIG. 1) can identify the virtual drives 110(1-2) that correspond to virtual machine 106 at host computer 104(1). Virtual drive 110(1) of virtual machine 106 is mapped to LUN 120(1) of the storage array 114 and is connected through the data network 118 by host bus adapter 124(1). Similarly, virtual drive 110(2) of virtual machine 106 is mapped to LUN 120(3) of the storage array 114 and is connected through the data network 118 by host bus adapter 124(2).

At block 304, the virtual drive(s) are mapped to a mapping file that is stored on a LUN of the storage array. For example, LUN 120(1) of the storage array 114 references mapping file 128 that maps the virtual drives 110(1-2) of virtual machine 106 to the LUN.

At block 306, each LUN is determined to be accessible through a storage interface of the storage array. For example, virtual manager 102 can determine whether the LUNs 120(1) and 120(3) are "visible" to both of the host computers 104(1) and 104(2) through the storage interface 116. The virtual manager 102 can identify communication ports 204 of the storage interface 116 that the LUNs are mapped to for data communication. The virtual manager 102 can then determine whether the first host computer 104(1) and the second host computer 104(2) can access the storage array 114 via any of the identified communication ports 204. In an event that both of the host computers 104(1) and 104(2) can access the storage array 114 via at least one of the identified communication ports 204 (and not necessarily the same communication port), virtual machine 106 can be migrated from the first host computer 104(1) to the second host computer 104(2). Determining that each LUN is accessible through the storage interface of the storage array is further described with reference to the method shown in FIG. 4.

At block 308, each LUN is unmasked to migrate the virtual machine from a first host computer to a second host computer. For example, the virtual manager 102 can initiate that the LUN masks 122(1) and 122(3) be changed to unmask respective LUNs 120(1) and 120(3) from host computer 104(1), and to associate the LUNs with host computer 104(2) to migrate the virtual machine 106 from host computer 104(1) to host computer 104(2). If the data network 118 is implemented as an iSCSI network, unmasking each of the LUNs 120(1) and 120(3) to host computer 104(2) includes logging each LUN out of the host computer 104(1) and logging the LUNs into the host computer 104(2).

At block 310, the virtual machine is deleted from the first host computer, and at block 312, the virtual drive(s) are disassociated from the first host computer. For example, the virtual drives 110(1-2) of virtual machine 106 can be disassociated from host computer 104(1), and virtual machine 106 can be deleted from host computer 104(1).

At block 314, the virtual machine is created on the second host computer according to the mapping file such that the virtual drive(s) are each mapped from the respective LUN of the storage array to the virtual machine on the second host computer. For example, virtual machine 106 can be created on host computer 104(2) according to mapping file 128 such that the virtual drives 110(1-2) are each mapped from the respective LUNs 120(1) and 120(3) on the storage array 114 to the virtual machine 106 on the host computer 104(2).

Each of the method blocks 302 to 314 described with reference to example method 300 can be implemented as restartable tasks of virtual machine migration such that if a task fails to be completed, the virtual machine migration can be restarted from the task that failed. The restartable tasks can each be implemented to first check if a task has been completed. If a task is determined to have been completed, then the next task can be initiated. If a task of virtual machine migration fails due to a transient error or network connectivity failure, for example, the task can be restarted and virtual machine migration will continue from where it failed. In an implementation, a check to determine whether a task has been performed can include a check of a database that maintains task information persisted when a method block has been completed. Alternatively, or in addition, a query can be performed to determine if a task has been completed, such as checking whether the virtual drives have been identified, mapped to the mapping file, and the like.

Figure 4:
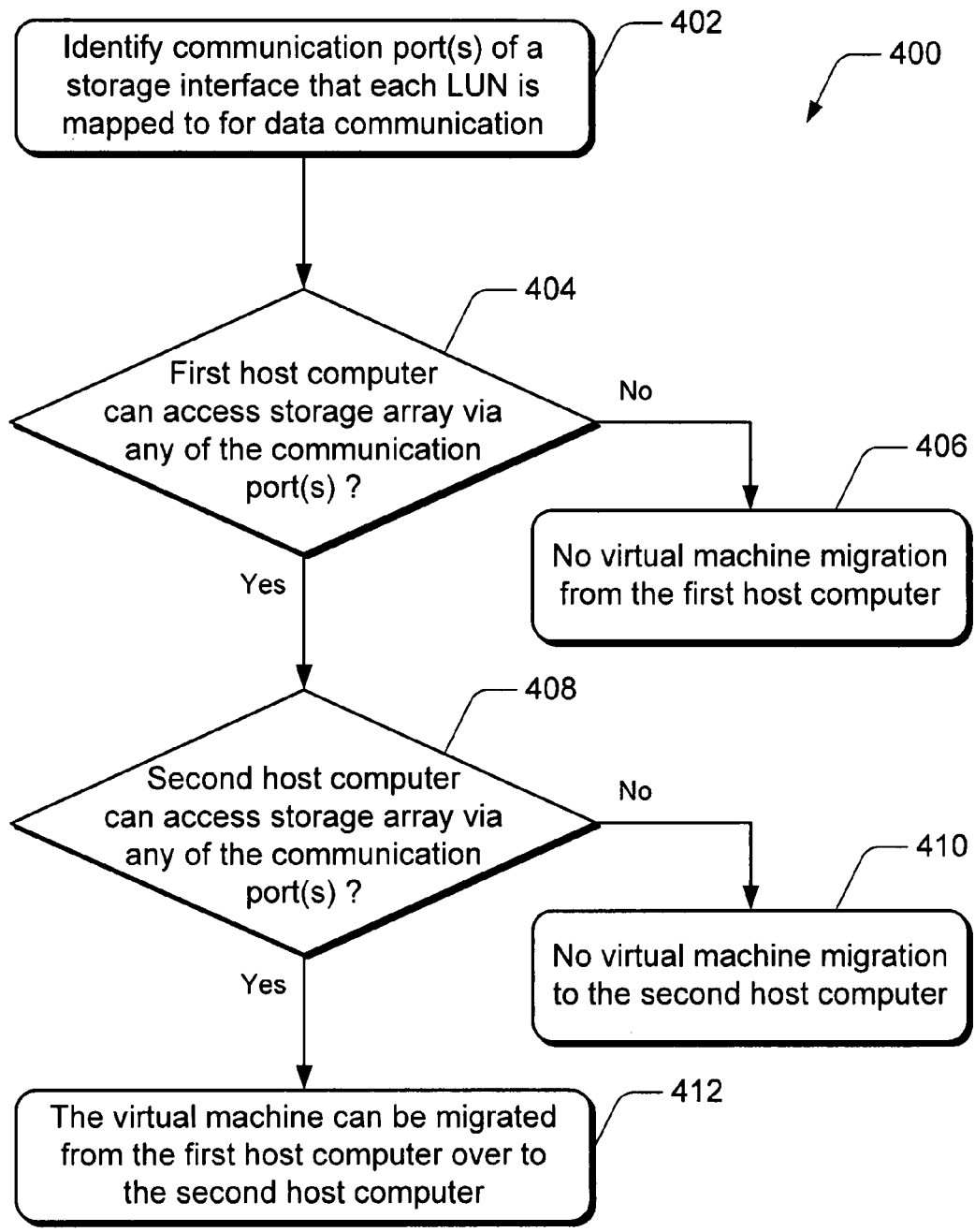
FIG. 4 further illustrates example method(s) for virtual machine migration in accordance with one or more embodiments.

FIG. 4 illustrates example method(s) 400 of virtual machine migration, and in an embodiment, is an implementation of method block 306 to determine LUNs that are accessible through the storage interface of the storage array to facilitate virtual machine migration. The order in which the method is described is not intended to be construed as a limitation, and any number of the described method blocks can be combined in any order to implement the method, or an alternate method.

At block 402, communication port(s) of a storage interface that each LUN is mapped to for data communication are identified. For example, before initiating migration of virtual machine 106, the virtual manager 102 (FIG. 1) can identify the communication ports 204 (FIG. 2) of the storage interface 116 to which each of the LUNs 120(1) and 120(3) are mapped to for data communication.

At block 404, a determination is made as to whether a first host computer can access the storage array via any of the identified communication port(s). If the first host computer cannot access the storage array via any of the identified communication port(s) (i.e., "No" from block 404), then virtual machine migration is not viable from the first host computer at block 406.

If the first host computer can access the storage array via any of the identified communication port(s) (i.e., "Yes" from block 404), then a determination is made as to whether a second host computer can access the storage array via any of the identified communication port(s) at block 408. If the second host computer cannot access the storage array via any of the identified communication port(s) (i.e., "No" from block 408), then virtual machine migration is not viable to the second host computer at block 410.

If the second host computer can access the storage array via any of the identified communication ports (i.e., "Yes" from block 408), then the virtual machine can be migrated from the first host computer to the second host computer. For example, in an event that host computers 104(1) and 104(2) can both access the storage array 114 via at least one of the identified communication ports 204 (and not necessarily the same communication port), the virtual manager 102 can initiate the migration of virtual machine 106 from host computer 104(1) over to host computer 104(2).

Figure 5:
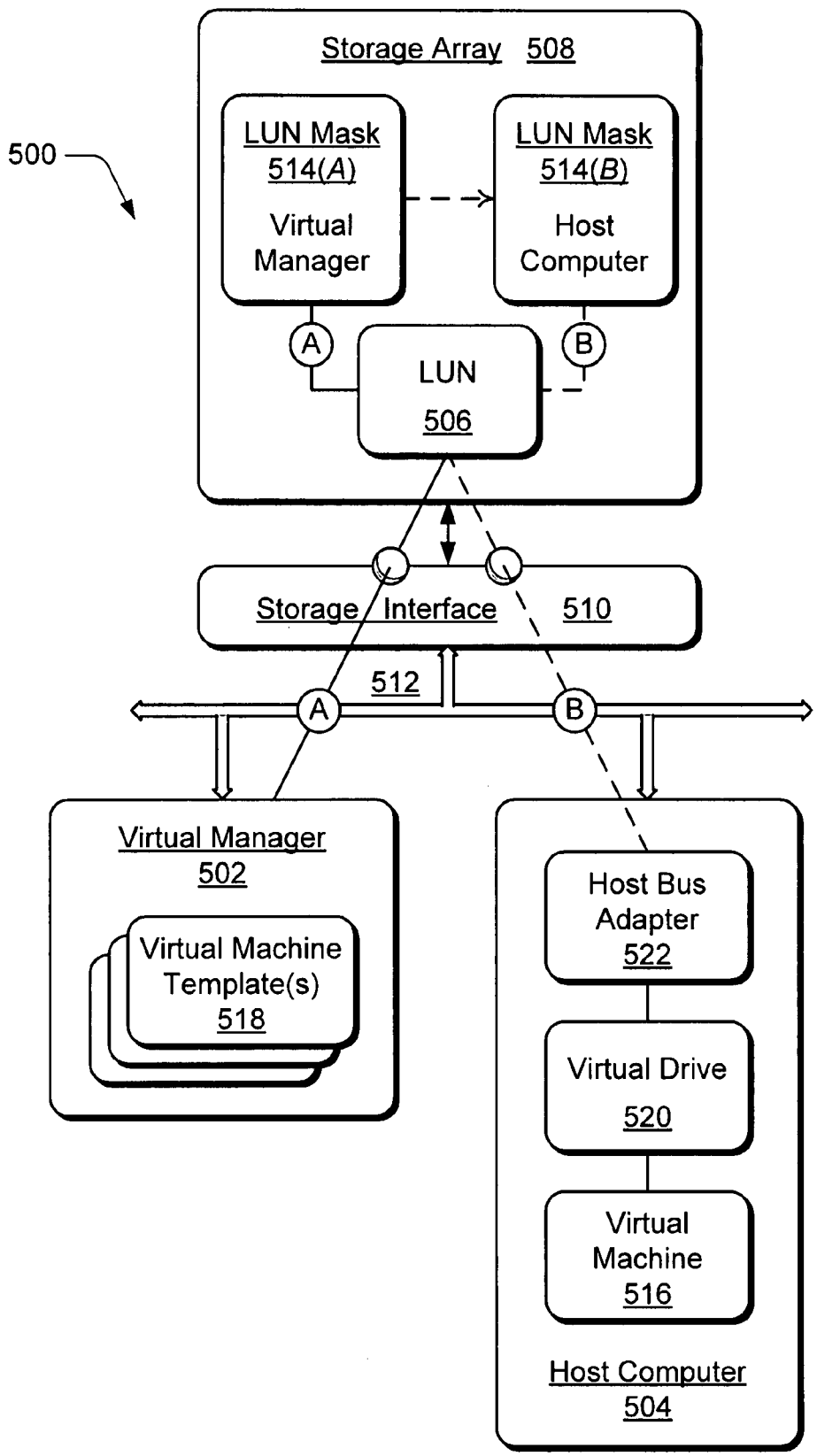
FIG. 5 illustrates an example virtualization system in which embodiments of virtual machine migration can be implemented.

FIG. 5 illustrates an example virtualization system 500 in which embodiments of virtual machine migration can be implemented. In an embodiment, a virtual machine can be created from a template file that defines a model of a virtual machine, and then the virtual machine can be migrated to a host computer. In virtualization system 500, a virtual manager 502 manages and controls any number of host computers, such as host computer 504 that is a virtual host computer to any number of virtual machines.

The virtual manager 502 can initiate creation of a LUN 506 on a storage array 508 that can include any number of physical drives and/or storage media. The storage array 508 is network-connected through a storage interface 510 to the virtual manager 502 and host computer 504 via a data network 512. The data network 512 can be implemented as any type of data or communication network with any type of protocol, and can be represented or otherwise implemented as a combination of two or more networks. For example, the data network 512 can be implemented as a fibre channel or as an iSCSI network that communicatively links the storage interface 510 of the storage array 508 to the virtual manager 502 and host computer 504.

The storage array 508 includes LUN 506 that is a "logical unit number" which represents a unit of storage exposed or made available by the storage array 508. The LUN 506 can map to several physical drives and/or storage media of the storage array 508, and can be implemented as any type of LUN. The LUN 506 has a corresponding LUN mask 514(A) that identifies which device can access the LUN.

After the virtual manager 502 creates LUN 506, the virtual manager 502 can unmask the LUN to the virtual manager to associate the LUN with the virtual manager. In this example, LUN mask 514(A) initially associates LUN 506 with the virtual manager 502 (illustrated by the association "A"). The virtual manager 502 can initiate creation of virtual machine 516 from a virtual machine template 518 such that the virtual machine is created as a software component of host computer 504. The virtual machine 516 has an associated virtual drive 520 that is mapped to LUN 506 of the storage array 508 and is connected through the data network 512 by a host bus adapter 522.

After the virtual machine 516 is created on host computer 504, the virtual manager 502 can then unmask LUN 506 to map the LUN from the virtual manager to the virtual drive 520 of the virtual machine 516 on host computer 504. In this example, LUN mask 514(B) illustrates the updated masking to associate LUN 506 with host computer 504 (illustrated by the association "B").

In an embodiment of virtual machine migration, the virtual manager 502 can receive configuration inputs to define a reliability configuration level of the storage array 508 when the LUN 506 and the virtual machine 516 are created. For example, an administrator may initiate creation of the virtual machine and from a configuration user interface, input reliability and configuration information such as a particular RAID configuration on the storage array 508.

Figure 6:
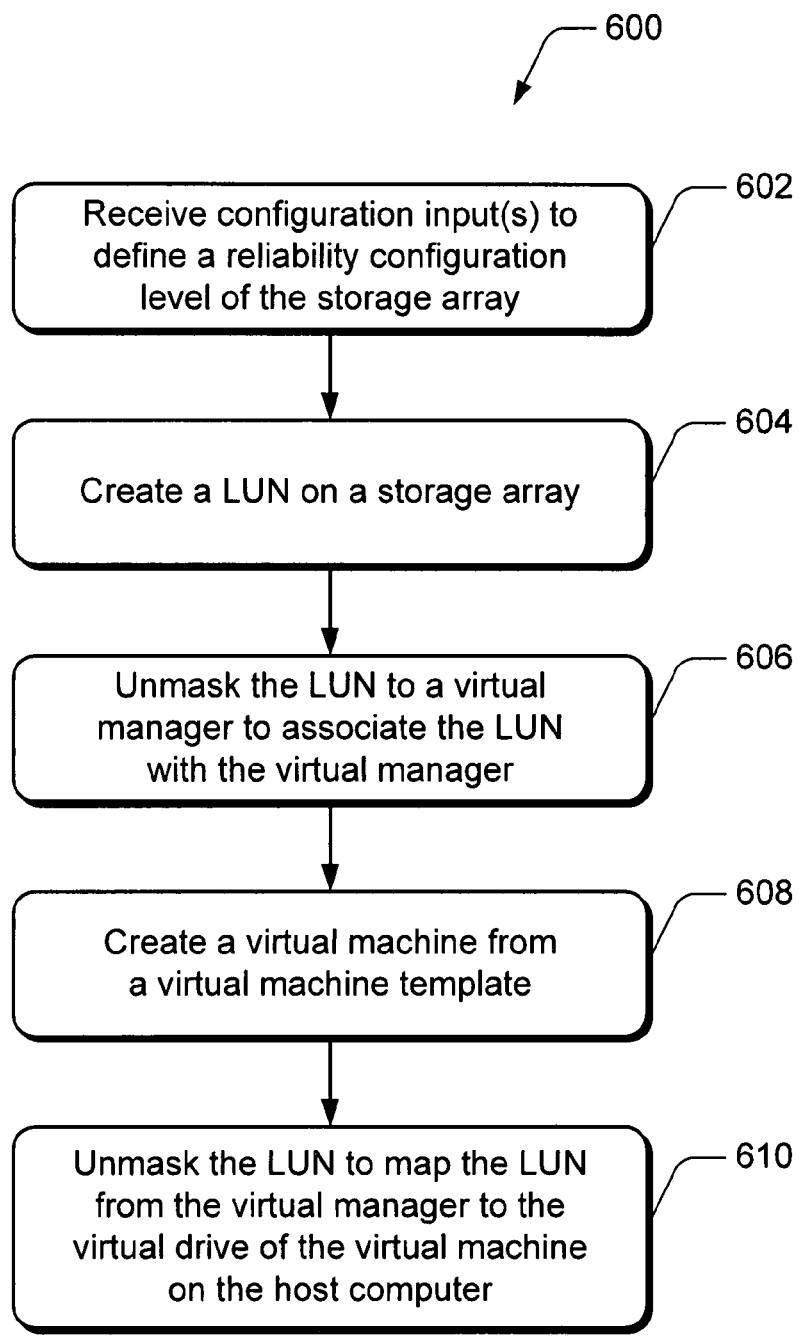
FIG. 6 illustrates example method(s) for virtual machine migration in accordance with one or more embodiments.

FIG. 6 illustrates example method(s) 600 of virtual machine migration that includes creating a virtual machine from a template file, and then migrating the virtual machine to a host computer. The order in which the method is described is not intended to be construed as a limitation, and any number of the described method blocks can be combined in any order to implement the method, or an alternate method.

At block 602, configuration input(s) are received to define a reliability configuration level of a storage array when a virtual machine is created. For example, virtual manager 502 can receive configuration inputs to define a reliability configuration level of the storage array 508 when the LUN 506 and the virtual machine 516 are created.

At block 604, a LUN is created on a storage array. For example, virtual manager 502 (FIG. 5) initiates creation of LUN 506 on storage array 508. The LUN 506 can be created on the storage array 508 in accordance with configuration reliability information that defines a reliability level of the LUN. At block 606, the LUN is unmasked to the virtual manager to associate the LUN with the virtual manager. For example, LUN 506 has a corresponding LUN mask 514(A) that initially identifies which device can access the LUN. The LUN mask 514(A) is unmasked to the virtual manager 502 to associate the LUN with the virtual manager.

At block 608, a virtual machine is created from a virtual machine template. For example, virtual machine 516 can be created from a virtual machine template 518 as a software component of host computer 504, and the virtual machine 516 has an associated virtual drive 520. The virtual machine template 518 can include the configuration reliability information for virtual drive(s), such as virtual drive 520 of the virtual machine 516 on host computer 504.

At block 610, the LUN is unmasked to map the LUN from the virtual manager to the virtual drive of the virtual machine on the host computer. For example, the virtual manager 502 can unmask LUN 506 to map the LUN from the virtual manager to the virtual drive 520 of the virtual machine 516 on host computer 504. The LUN mask 514(B) illustrates the updated masking to associate LUN 506 with host computer 504.

Figure 7:
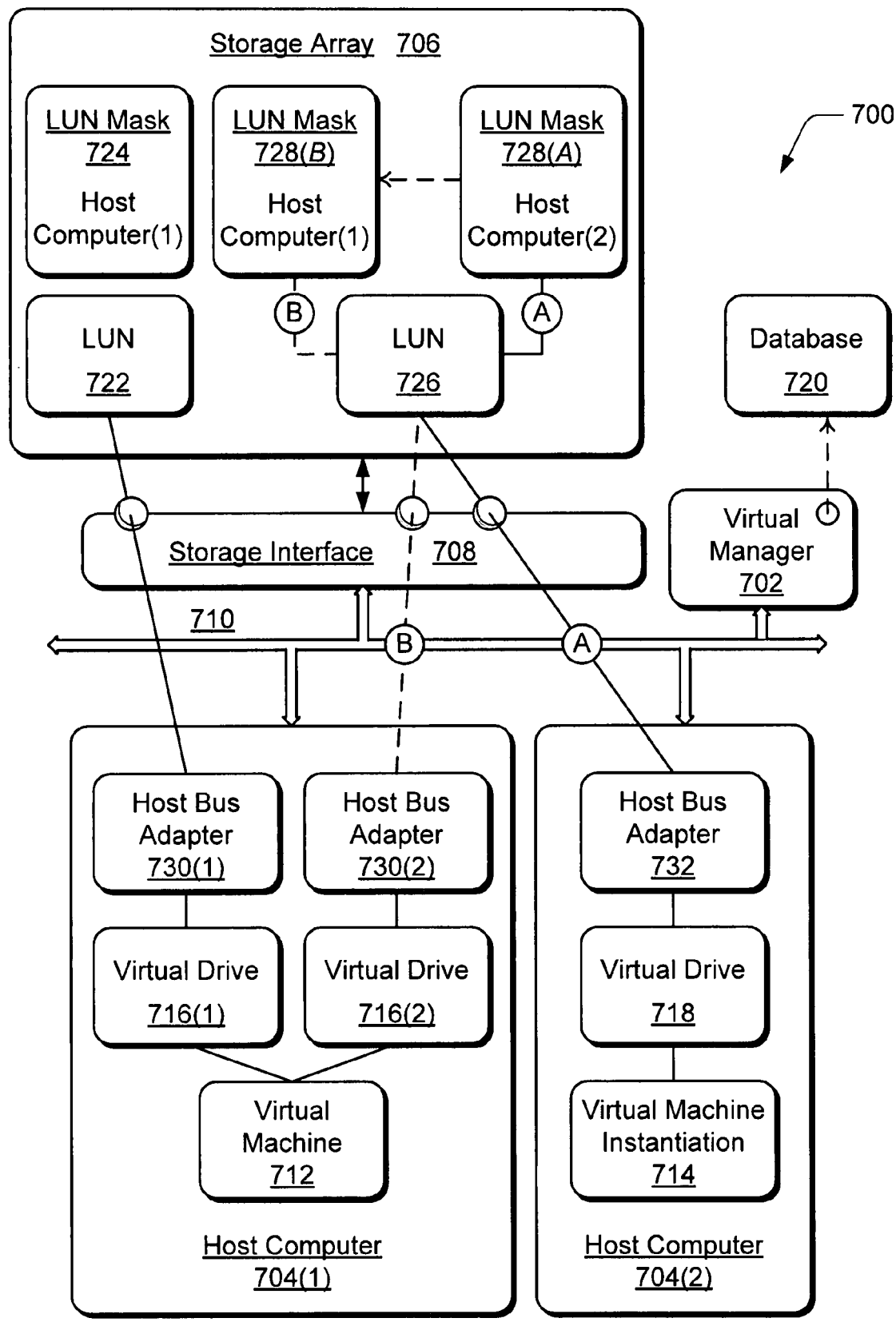
FIG. 7 illustrates an example virtualization system in which embodiments of virtual machine migration can be implemented.

FIG. 7 illustrates an example virtualization system 700 in which embodiments of virtual machine migration can be implemented. In an embodiment, the association of a database on a storage array can be migrated from a virtual machine on a first host computer to an instantiation of the virtual machine on a second host computer. In the virtualization system 700, a virtual manager 702 manages and controls host computers 704(1-2). A storage array 706 is network-connected through a storage interface 708 to the virtual manager 702 and host computers 704(1-2) via a data network 710.

In this example, host computer 704(1) includes a virtual machine 712, and host computer 704(2) includes an instantiation of the virtual machine 714. The virtualization system 700 is an example of a database system having a database application (i.e., virtual machine 712 and virtual machine instantiation 714) running on two different host computers 704(1-2). The virtual machine 712 and virtual machine instantiation 714 are each implemented as a software component of a respective host computer.

In this example, virtual machine 712 in host computer 704(1) has two associated virtual drives 716(1-2). Similarly, virtual machine instantiation 714 in host computer 704(2) has an associated virtual drive 718. Although virtual machine 712 is shown having only two associated virtual drives, and virtual machine instantiation 714 is shown having only one associated virtual drive, any number of virtual drives can be associated with a virtual machine. The virtual drives 716(1-2) and 718 can each be implemented as a file at a respective host computer which maps to a physical drive on the network-connected storage array 706. Any one or more of the virtual drives 716(1-2) and 718 can each be implemented based on independent reliability configurations, and the storage array 706 can include any number of physical drives and/or storage media. In addition, the virtual manager can include a database 720 that maintains database data for the database application (i.e., virtual machine 712 and virtual machine instantiation 714).

The storage array 706 includes a LUN 722 that maps virtual drive 716(1) of virtual machine 712 to the physical drive(s) on storage array 706. The LUN 722 has a corresponding LUN mask 724 that identifies host computer 704(1) as having access to LUN 722. The storage array 706 also includes a LUN 726 that initially maps virtual drive 718 of virtual machine instantiation 714 to the database 720 (e.g., physical drive(s)) on storage array 706. The LUN 726 has a corresponding LUN mask 728(A) that initially identifies host computer 704(2) as having access to the LUN (illustrated by the association "A"). Virtual drive 716(1) of virtual machine 712 is mapped to LUN 722 and is connected through the data network 710 by host bus adaptor 730(1). Similarly, virtual drive 718 of virtual machine instantiation 714 is initially mapped to LUN 726 and is connected through the data network 710 by host bus adapter 732.

In this embodiment of virtual machine migration, the virtual manager 702 can unmask LUN 726 to map the LUN from host computer 704(2) to the virtual drive 716(2) of the virtual machine 712 on host computer 704(1). In this example, LUN mask 728(B) illustrates the updated masking to associate LUN 726 with host computer 704(1) (illustrated by the association "B"). In this embodiment, the database 720 (e.g., physical drive(s)) on storage array 706 that is a database of the database applications is migrated from host computer 704(2) to host computer 704(1). Virtual drive 716(2) of virtual machine 712 is then mapped to LUN 726 and is connected through the data network 710 by host bus adapter 730(2).

Figure 8:
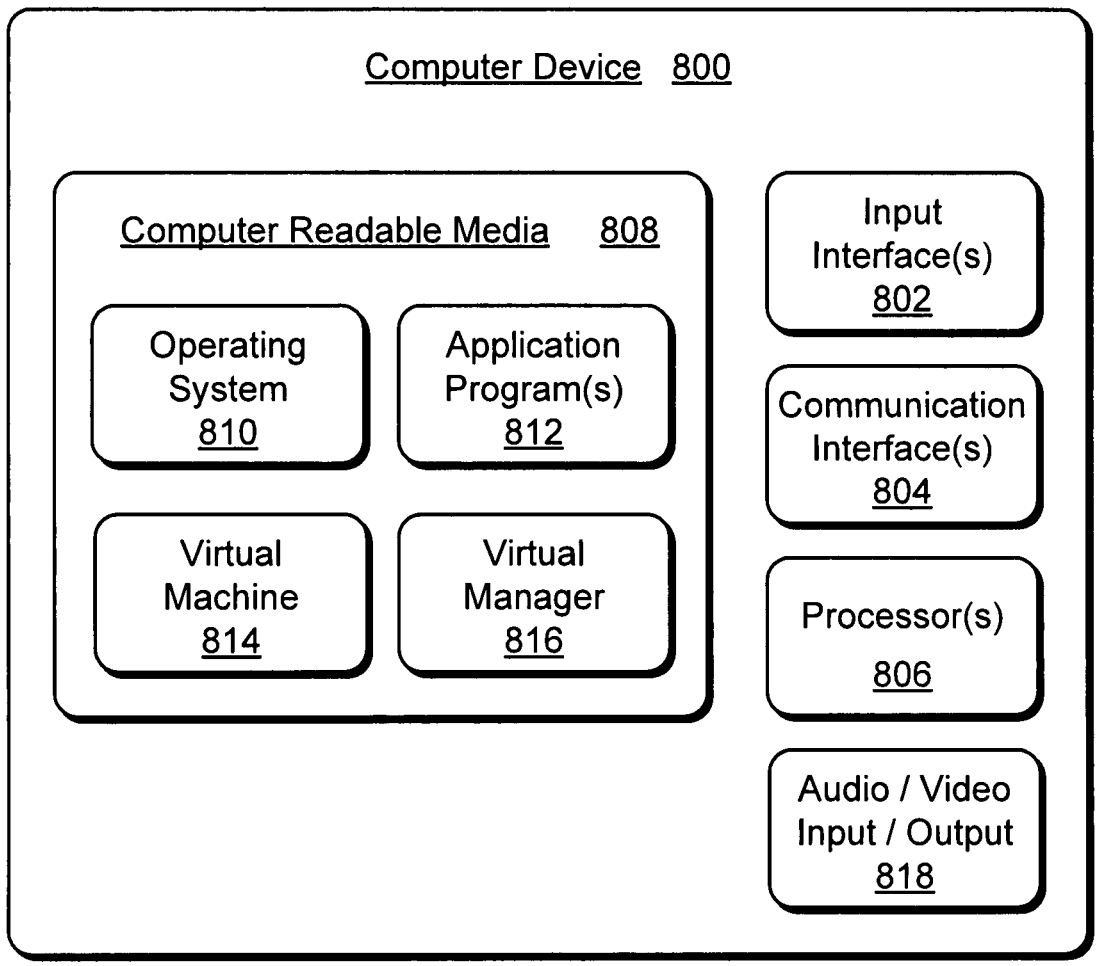
FIG. 8 illustrates various components of an example computer device which can implement embodiments of virtual machine migration.

FIG. 8 illustrates various components of an example computer device 800 that can be implemented as any form of a computer, electronic, and/or computing-based device to implement embodiments of virtual machine migration. For example, the computer device 800 can be implemented as any of the host computers 104(1-2) described with reference to FIGS. 1-2, as host computer 504 described with reference to FIG. 5, or as the host computers 704(1-2) described with reference to FIG. 7.

Computer device 800 includes one or more input interface(s) 802 by which any type of data inputs can be received. Computer device 800 further includes communication interface(s) 804 which can be implemented as any one or more of a serial and/or parallel interface, a wireless interface, any type of network interface, a modem, and as any other type of communication interface for external communication, such as with networked devices and systems.

Computer device 800 also includes one or more processors 806 (e.g., and of microprocessors, controllers, and the like). The processors 806 process various computer-executable instructions to control the operation of computer device 800, to communicate with other electronic and computing devices, and to implement embodiments of a virtual machine migration.

Computer device 800 can be implemented with computer-readable storage media 808, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like. The computer-readable storage media 808 enables persistent data storage and does not include transitory media, such as carrier waves, signal transmission, or signals per se.

Computer-readable media 808 provides data storage mechanisms to store various information and/or data such as software applications and any other types of information and data related to operational aspects of computer device 800. For example, an operating system 810 and/or other application programs 812 can be maintained as software applications with the computer-readable media 808 and executed on processor(s) 806 to implement embodiments of virtual machine migration.

As software components, a virtual machine 814 and/or a virtual manager 816 can be maintained with the computer-readable media 808 and executed on processor(s) 806 to implement embodiments of virtual machine migration. In various embodiments, the virtual manager 816 initiates and manages virtual machine migration from one host computer to another in a virtualization system.

Computer device 800 may also include an audio and/or video output 818 to provide audio and video data to an audio rendering and/or display system. An audio rendering and/or display system can include any devices that process, display, and/or otherwise render audio, video, and image data. Video signals and audio signals can be communicated from computer device 800 to a display device via an RF (radio frequency) link, S-video link, composite video link, component video link, analog audio connection, or other similar communication link. In an implementation, an audio rendering and/or display system be integrated components of the computer device 800.

Although shown separately, some of the components of computer device 800 can be implemented in an application specific integrated circuit (ASIC). Additionally, a system bus (not shown) typically connects the various components within computer device 800. A system bus can be implemented as one or more of any of several types of bus structures, including a memory bus or memory controller, a peripheral bus, an accelerated graphics port, or a local bus using any of a variety of bus architectures.

Although embodiments of virtual machine migration have been described in language specific to features and/or methods, it is to be understood that the subject of the appended claims is not necessarily limited to the specific features or methods described. Rather, the specific features and methods are disclosed as example implementations of virtual machine migration.

The invention claimed is:

1. A method for virtual machine migration, the method comprising:
   initiating restartable migration tasks for the virtual machine migration, the restartable migration tasks comprising:
      identifying one or more virtual drives of a virtual machine that are each mapped to a different respective LUN (logical unit number) of a storage array having one or more LUNs;
      mapping the one or more virtual drives to a mapping file that is stored on one of the LUNs of the storage array;
      unmasking each of the one or more LUNs to migrate the virtual machine from a first host computer to a second host computer;
      creating the virtual machine on the second host computer according to the mapping file, the one or more virtual drives each being mapped from the different respective LUN of the storage array to the virtual machine on the second host computer;
      deleting the virtual machine from the first host computer; and
      disassociating the one or more virtual drives from the first host computer after deleting the virtual machine from the first host computer; and
   restarting from one of the restartable migration tasks for the virtual machine migration if one of the identifying, mapping, unmasking, creating, deleting, or disassociating restartable migration tasks fails to be completed.

2. A method as recited in claim 1, further comprising determining that each of the one or more LUNs is accessible to the second host computer through a storage interface of the storage array.

3. A method as recited in claim 2, further comprising:
   identifying one or more communication ports of the storage interface that each of the one or more LUNs is mapped to for data communication;
   determining whether the first host computer can access the storage array via any of the one or more identified communication ports;
   determining whether the second host computer can access the storage array via any of the one or more identified communication ports; and
   migrating the virtual machine from the first host computer to the second host computer in an event that the first host computer can access the storage array via at least one of the identified communication ports, and in an event that the second host computer can access the storage array via at least one of the identified communication ports.

4. A method as recited in claim 1, wherein unmasking each of the one or more LUNs to the second host computer includes logging each of the one or more LUNs into an iSCSI (Internet Small Computer System Interface) network that communicatively links a storage interface of the storage array to the first host computer and to the second host computer.

5. A method as recited in claim 1, further comprising creating a LUN of the storage array in accordance with configuration reliability information that defines a reliability level of the LUN.

6. A computer system, comprising:
   at least a memory and a processor to implement a virtual manager configured to initiate and manage migration of a virtual machine from a first host computer to a second host computer, the virtual machine configured to execute on the first host computer;
   a LUN (logical unit number) of a storage array that is mapped to a virtual drive of the virtual machine;
   a mapping file that maps the virtual drive of the virtual machine to the LUN;
   a LUN mask configured to associate the LUN with the first host computer of the virtual machine, the LUN mask being configurable to unmask the LUN to migrate the virtual machine from the first host computer to the second host computer; and
   the virtual manager further configured to:
      create the virtual machine on the second host computer according to the mapping file;
      delete the virtual machine from the first host computer; and
      disassociate the virtual drive from the first host computer after the virtual machine is deleted from the first host computer.

7. A computer system as recited in claim 6, wherein the LUN of the storage array is configured to reference the mapping file that maps the virtual drive of the virtual machine to the LUN.

8. A computer system as recited in claim 6, wherein the virtual manager is further configured to determine that the LUN is accessible to the second host computer through a storage interface of the storage array to facilitate the migration of the virtual machine from the first host computer to the second host computer.

9. A computer system as recited in claim 8, wherein the virtual manager is further configured to:
   identify one or more communication ports of the storage interface that the LUN is mapped to for data communication;
   determine whether the first host computer can access the storage array via any of the one or more identified communication ports;

determine whether the second host computer can access the storage array via any of the one or more identified communication ports; and said initiate and manage the migration of the virtual machine from the first host computer to the second host computer in an event that the first host computer can access the storage array via at least one of the identified communication ports, and in an event that the second host computer can access the storage array via at least one of the identified communication ports.

10. A computer system as recited in claim 6, further comprising an iSCSI (Internet Small Computer System Interface) network configured to communicatively link a storage interface of the storage array to the first host computer and to the second host computer, and wherein the LUN is unmasked to the second host computer when the LUN is logged out of the first host computer and logged into the second host computer.

11. One or more computer-readable storage media comprising computer-executable instructions that, when executed, direct a virtual manager to:
   implement restartable migration tasks for virtual machine migration that include to:
      initiate creation of one or more LUNs (logical unit numbers) on a storage array;
      unmask the one or more LUNs to the virtual manager to associate the one or more LUNs with the virtual manager;
      initiate creation of a virtual machine from a virtual machine template, the virtual machine having an associated one or more virtual drives and configured to execute on a host computer;
      unmask the one or more LUNs to map each of the one or more LUNs from the virtual manager to a different respective virtual drive of the virtual machine on the host computer;
      initiate migration of the virtual machine from the host computer to an additional host computer;
      delete the virtual machine from the host computer after the virtual machine is migrated from the host computer to the additional host computer; and
      disassociate the one or more virtual drives from the host computer after the virtual machine is deleted from the host computer; and
   restart from one of the restartable migration tasks for the virtual migration if one of the restartable migration tasks fails to be completed.

12. One or more computer-readable storage media as recited in claim 11, further comprising computer-executable instructions that, when executed, direct the virtual manager to receive one or more configuration inputs to define a reliability configuration level of the storage array when the virtual machine is created.

13. One or more computer-readable storage media as recited in claim 11, further comprising computer-executable instructions that, when executed, direct the virtual manager to:
   map the one or more virtual drives to a mapping file that is stored on one of the LUNs of the storage array;
   unmask the one or more LUNs from the host computer to the additional host computer to migrate the virtual machine from the host computer to the additional host computer; and
   initiate creation of the virtual machine on the additional host computer according to the mapping file, each of the one or more virtual drives mapped from the one or more LUNs of the storage array to the virtual machine on the additional host computer.

14. One or more computer-readable storage media as recited in claim 13, further comprising computer-executable instructions that, when executed, direct the virtual manager to:
   determine that the one or more LUNs are accessible to the additional host computer through a storage interface of the storage array;
   identify one or more communication ports of the storage interface that the one or more LUNs are mapped to for data communication;
   determine whether the host computer can access the storage array via any of the one or more identified communication ports;
   determine whether the additional host computer can access the storage array via any of the one or more identified communication ports; and
   initiate migration of the virtual machine from the host computer to the additional host computer in an event that the host computer can access the storage array via at least one of the identified communication ports, and in an event that the additional host computer can access the storage array via at least one of the identified communication ports.

15. One or more computer-readable storage media as recited in claim 11, further comprising computer-executable instructions that, when executed, direct the virtual manager to unmask an additional LUN on the storage array to migrate the additional LUN from the additional host computer to an additional virtual drive of the virtual machine on the host computer, the one or more virtual drives and the additional virtual drive each being mapped to respective databases of the virtual machine.

16. One or more computer-readable storage media as recited in claim 11, further comprising computer-executable instructions that, when executed, direct the virtual manager to:
   initiate creation of a virtual machine instantiation of the virtual machine on the additional host computer, the virtual machine instantiation having an additional virtual drive and configured to execute on the additional host computer; and
   unmask the one or more LUNs to map one of the LUNs from the host computer to the additional virtual drive of the virtual machine instantiation on the additional host computer.

* * * * *